United States Patent

Grice

Patent Number: 5,596,973
Date of Patent: Jan. 28, 1997

[54] FUEL EXPANDER

[76] Inventor: Franklin R. Grice, P.O. Box 326, Aymor, S.C. 29511

[21] Appl. No.: 463,924

[22] Filed: Jun. 5, 1995

[51] Int. Cl.⁶ .................................................. F02M 31/00
[52] U.S. Cl. ............................................................ 123/557
[58] Field of Search ................................... 123/557, 549, 123/546; 165/164

[56] References Cited

U.S. PATENT DOCUMENTS

| | | | |
|---|---|---|---|
| 2,611,585 | 9/1952 | Boling | 165/164 |
| 3,253,647 | 5/1966 | Deshaies | 123/557 |
| 4,434,774 | 3/1984 | Horiuchi . | |
| 4,436,075 | 3/1984 | Campbell et al. | 123/557 |
| 4,748,961 | 6/1988 | Headley et al. | 123/557 |
| 4,841,943 | 6/1989 | Favreau et al. | 123/557 |
| 4,858,584 | 8/1989 | Bridgeman | 123/557 |
| 4,883,040 | 11/1989 | Rocky . | |
| 5,411,005 | 5/1995 | Bohl et al. | 123/557 |
| 5,443,053 | 2/1995 | Johnson | 123/557 |

Primary Examiner—Marguerite McMahon
Attorney, Agent, or Firm—B. Craig Killough

[57] ABSTRACT

A fuel expander which is placed in-line in a fuel supply system for an engine has heat exchange means, which receives heat from an engine component, such as a radiator hose, and transfers the heat to the fuel supply system prior to the fuel reaching the engine. The fuel expander has a mesh screen near the entrance to the fuel expander. Auxiliary heating means may be used with the device.

8 Claims, 2 Drawing Sheets

FUEL EXPANDER

FIELD OF THE INVENTION

This invention relates to engine fuel systems generally and is more specifically directed to a device which is fitted to a fuel transport system, and which expands the fuel to provide increased fuel economy.

BACKGROUND OF THE INVENTION

Liquid fuels are used to power many types of engines. Commonly, engine fuels are liquid, organic fuels having relatively low boiling points, and which readily vaporize. The most common example of such fuels is gasoline, although diesel fuel and other petroleum oil derivatives are in common use. Alcohols are also in common use as fuels for engines. The most common engine with which such fuels are used is the internal combustion engine. Piston engines and turbines are in common use, and other types of engines use liquid fuels.

For reasons of economy, and for reasons of the environment, much research and investigation has been performed to discover ways to reduce the amount of fuel consumed for a given amount of energy produced by an engine. It is recognized that by vaporizing the fuel prior to introducing the fuel into the carburetor, fuel injection system, or other carburetion system, increased fuel mileage is obtained. A device which provides fuel vaporization is disclosed in Rocky, U.S. Pat. No. 4,883,040. A vaporizer for a liquified petroleum gas engine is shown in Horiuchi, U.S. Pat. No. 4,434,774.

Engines which burn liquid fuels inherently produce heat. A heat exchanger may be used to vaporize fuel, using heat from the engine.

SUMMARY OF THE PRESENT INVENTION

The present invention is a fuel expander. The fuel expander may be a wound tube which is positioned in a fuel line or fuel transport means. The windings of the round tube may surround a radiator hose or other engine component having an elevated temperature during normal engine operation, and act as a heat exchanger to introduce heat into the fuel to expand the fuel.

A mesh member, such as a wire screen, is positioned downstream of the fuel flow from an entrance point into the device. The device may be of increased diameter just ahead of, or upstream of, the position of the wire mesh. As the fuel passes through the mesh member, the mesh member has a nozzle effect, and in combination with the larger diameter tube, modifies the flow characteristic of the fuel. The fuel then begins to travel through the wound tube, which acts a heat exchanger. The modified flow created by the mesh member and the heat which is introduced into the fuel expand the fuel.

DETAILED DESCRIPTION OF THE PREFERRED EMBODIMENT

Figure 1:
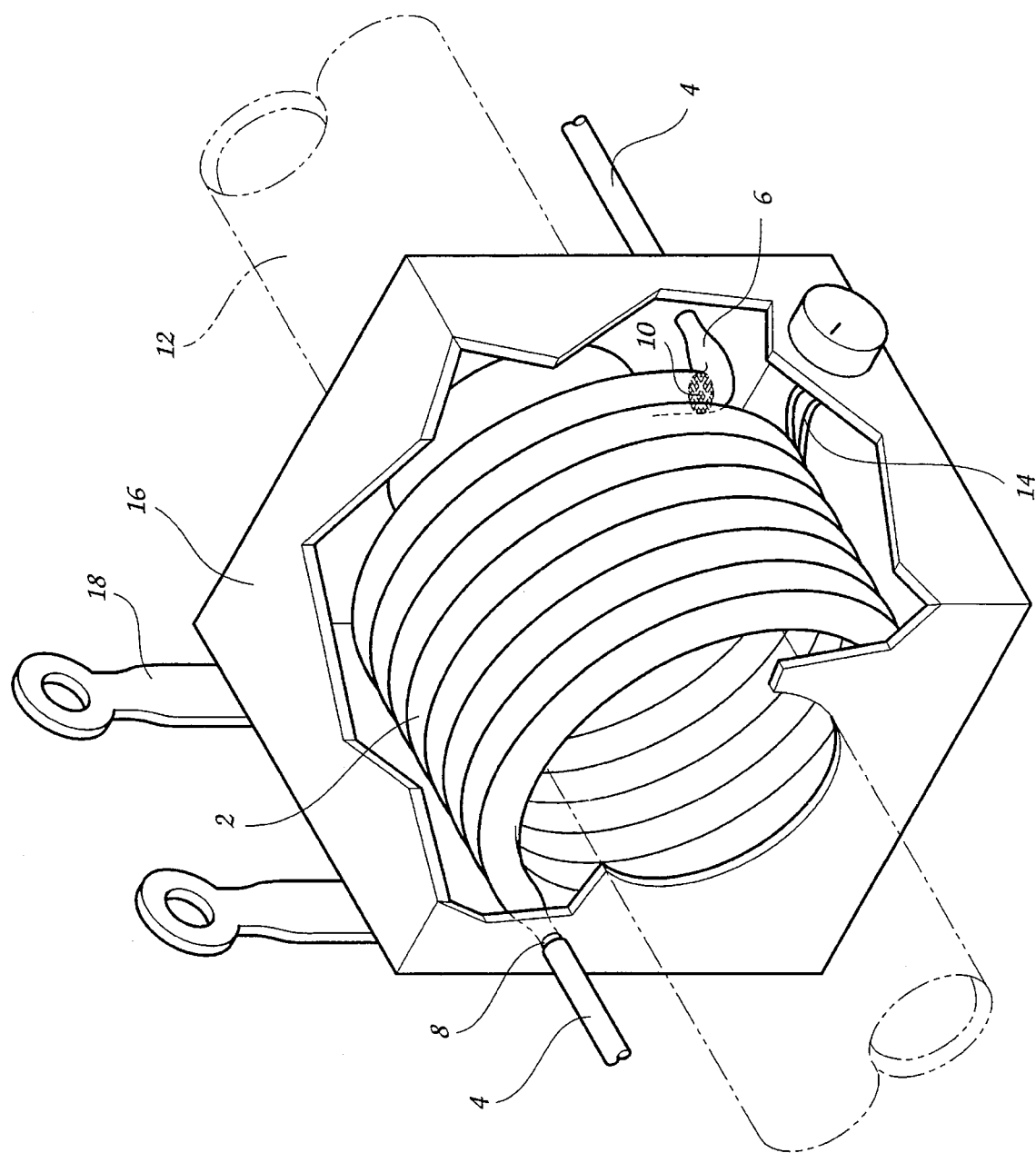
FIG. 1 is a perspective view of the fuel expander showing a housing which is partially cut away.
Figure 2:
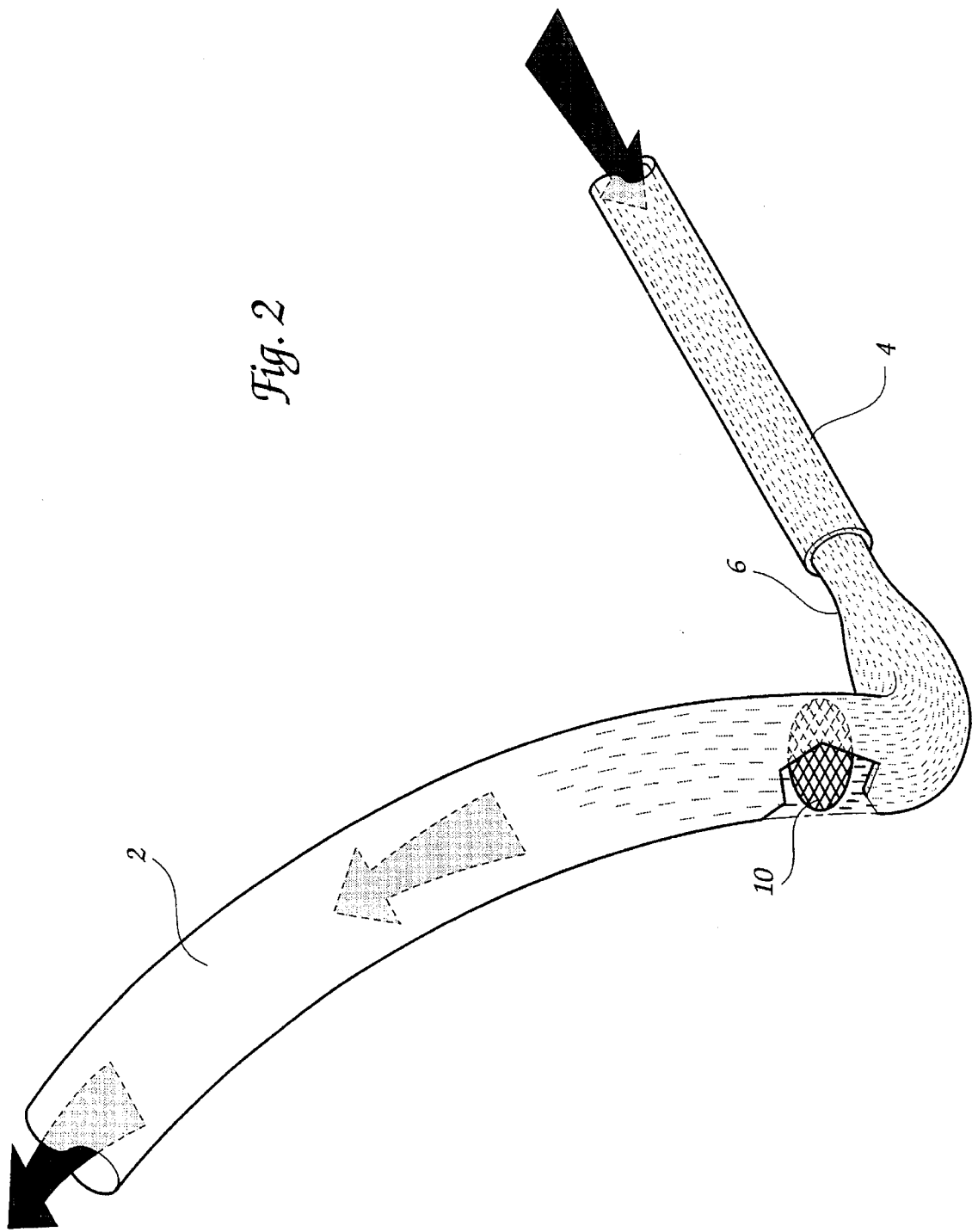
FIG. 2 is an isolation of the entrance to the fuel expander.

Referring now the drawing figures, FIG. 1 shows the fuel expander. A wound tube 2 is connected to a fuel line 4 at an entrance point 6 of the wound tube. The fuel line 4 is connected at the exit point 8 of the wound tube.

In the preferred embodiment, the wound tube is spirally wound, or helically wound. As shown, the spiral windings are of constant diameter, and the windings are in contact with each other. A goal of the present invention is to provide a heat exchange between the engine and the fuel passing through the fuel line, and accordingly, winding the tube to form a wound tube provides a substantial surface area over which the heat exchange is provided. In the preferred embodiment, therefore, the device is a spirally wound tube of constant diameter, with the spiral windings in contact with each other to maximize the surface area for heat exchange, while minimizing the amount of space which the device occupies.

The supply end of the fuel line 4 is connected to the entrance point 6. The tube 2 increases in diameter just past the entrance point. A mesh member 10 is positioned inside the tube just downstream from the entrance point. The mesh member may be formed of wire or synthetic materials which are capable of withstanding a constant flow of fuel through the screen or mesh. In the preferred embodiment, the mesh is comprised of a fine wire, having 20 to 150 openings per square inch.

The mesh member is positioned within the tube near the location where the diameter of the tube is increased. As fuel passes from the smaller and more restricted entrance point into the increased diameter part of the device, it also passes through the screen. The combination of the screen and the larger fuel line create a nozzle effect within the device. At the same time, the mesh member is positioned near the point of the device where the windings of the spiral round tube begin, and heat is introduced into the fuel.

Heat is supplied to the wound tube, and to the fuel which is traveling through the wound tube, by a hose. The hose has an elevated temperature, that is, a temperature which is elevated above ambient temperature.

Most commonly, the present invention will be used with water cooled engines. Water cooled engines have hoses through which water is transported from the engine to a radiator, and back to the engine. The water is cooled as it passes through the radiator or heat exchanger. The water is circulated through the engine to collect heat, and then back through the radiator. Other cooling agents, such as ethylene glycol, are used. Hoses are used for transporting water from an engine to a radiator or other heat exchanger, and provide a means for heating the fuel by means of the wound tube.

Hose 12 is inserted through the wound tube. In the preferred embodiment, the inside diameter of the wound tube will be sufficiently large to allow insertion of the hose, although the wound tube will contact the hose for maximum heat transfer between the hose and the wound tube. The outside diameter of the tube may, however, be less than the inside diameter of the wound tube.

In the preferred embodiment, the radiator hose which carries water from the radiator to the engine is used, however, other engine coolant hoses could be used. Pipes or hoses which carry heated gases, such as exhaust gases, could be used to provide heat to the wound tube. Accordingly, the term "hose" as used herein may also be applied to pipes or similar structures which carry liquids or gases of elevated temperatures.

Auxiliary heating means 14 may be used. The auxiliary heating means may be a resistor which is electrically powered. Direct current (DC) batteries are frequently used for starting engines and for other purposes related to engine or vehicle functions, and the resistor may be powered by such direct current batteries, and related charging systems. In some applications, external power may be used to provide an electrical energy source to the resistor. The resistor may be in a circuit with a thermostat. The thermostat may control the resistor so as to cause actuation of the resistor when the wound tubes fall below a predetermined temperature, or when the ambient air within the housing is below a predetermined temperature. The thermostat may be capable of variable control to adjust the temperature of the device as desired. Alternatively, a rheostat may be used to adjust the temperature level of the resistor. The rheostat could be provided with switch means which will allow the resistor to be disabled. The auxiliary heating means may be used to provide heat to the wound tube when the engine is cold, or in other situations where the heat provided by the hose is inadequate.

The device may be placed within a housing 16. The housing provides insulation, which allows heat to be retained around the wound tube, while at the same time aiding the hose in providing heat to the outer surfaces of the wound tube. At the same time, the housing provides insulation between the wound tube and the outside of the device, which increases the safety of the device. If a housing is used, openings are provided for the entrance and exit point of the wound tube, and for connection of the entrance point and the exit point to the fuel line. Controls for the auxiliary heating means are accessible.

In the preferred embodiment, the wound tube is comprised of a material having good heat conducting properties. In most applications, the wound tube will be comprised of metal. The wound tube may be comprised of ⅜" outside diameter cooper tubing. In the most common applications, the inside diameter of the wound tube will be between 2¼" and 3½" inches, although the inside diameter may be chosen according to the application. Likewise, the inside diameter of the copper tubing will be chosen according to the required fuel flow of the particular engine. A typical mesh for a smaller engine as used in the mesh member will have 140 to 150 openings per square inch. The mesh size may range, as an example, from 40 openings to 150 openings per square inch, with the finer mesh typically used with the smaller engines, and the mesh having larger openings used with larger engines. A common automotive water hose size is 2⅞" outside diameter. The housing may be provided with brackets 18 for mounting the housing to a vehicle body, or to other structures.

In the preferred embodiment, the wound tube has eight windings or spirals. As an alternative to a housing, or in addition to the housing, an insulation material may be positioned around the coils.

What is claimed is:

1. A fuel expander comprising a tube having fuel therein, wherein said tube comprises windings which contact a hose, and wherein said hose is of a temperature which is above ambient temperature, and wherein a mesh member is present within said tube immediately upstream from said windings at the point where said windings begin, and wherein said fuel is transported through said mesh member so as to interfere with the flow of said fuel thus dispersing the fuel particles as said fuel is transported through said tube.

2. A fuel expander, as described in claim 1, further comprising means for providing to said tube which is auxiliary to heat provided by said hose.

3. A fuel expander, as described in claim 1, further comprising a housing which surrounds and encloses said tube, and through which an entrance of said tube and an exit of said tube extend.

4. A fuel expander, as described in claim 2, further comprising a housing which surrounds and encloses said tube, and through which an entrance of said tube and an exit of said tube extend.

5. A fuel expander comprising a tube having fuel therein, wherein said tube comprises windings which contact a hose having a temperature which is above ambient temperature, and wherein a first length of said tube which is upstream from said windings has a smaller diameter and a second length of said tube which is downstream from said first length of said tube has a larger diameter and wherein a mesh member is positioned within said tube near a point of said tube were said first length joins said second length, and wherein said fuel is transported through said mesh member so as to interfere with the flow of said fuel as said fuel is transported through said tube.

6. A fuel expander, as described in claim 5, further comprising means for providing to said tube which is auxiliary to heat provided by said hose.

7. A fuel expander, as described in claim 5, further comprising a housing which surrounds and encloses said tube, and through which said entrance of said tube and an exit of said tube extend.

8. A fuel expander, as described in claim 6, further comprising a housing which surrounds and encloses said tube, and through which said entrance of said tube and an exit of said tube extend.

* * * * *